United States Patent

Hirs

[11] Patent Number: 4,826,596
[45] Date of Patent: May 2, 1989

[54] DRUM FILTER HAVING A MEDIA SUPPLY ROLL AND REROLL DRUM

[76] Inventor: Gene Hirs, 6865 Meadowlake Dr., Birmingham, Mich. 48010

[21] Appl. No.: 215,989

[22] Filed: Jul. 7, 1988

[51] Int. Cl.⁴ .................... B01D 33/02; B01D 33/12
[52] U.S. Cl. .................................... 210/387; 210/402
[58] Field of Search .............. 210/107, 122, 138, 387, 210/402, DIG. 3, 401; 55/352, 354; 134/110

[56] References Cited

U.S. PATENT DOCUMENTS

| | | | |
|---|---|---|---|
| 2,720,973 | 10/1955 | Gross | 210/387 |
| 2,720,974 | 10/1955 | Fowler | 210/387 |
| 2,823,806 | 2/1958 | Harlan | 210/401 |

FOREIGN PATENT DOCUMENTS 2639493  7/1978  Fed. Rep. of Germany ...... 210/387

Primary Examiner—Richard V. Fisher
Assistant Examiner—Linda S. Evans
Attorney, Agent, or Firm—Lyman R. Lyon

[57] ABSTRACT

An automatic drum filter comprises a perforated drum having a continuous filter media wrapped around substantially the entire periphery thereof. A supply roll of the media and a reroll drum are supported for rotation about an axis substantially parallel to the axis of the drum. A variable speed motor drives only the reroll drum. A pair of endless chains extend around each end of the drum so as to preclude axial displacement of the media on the drum.

5 Claims, 3 Drawing Sheets

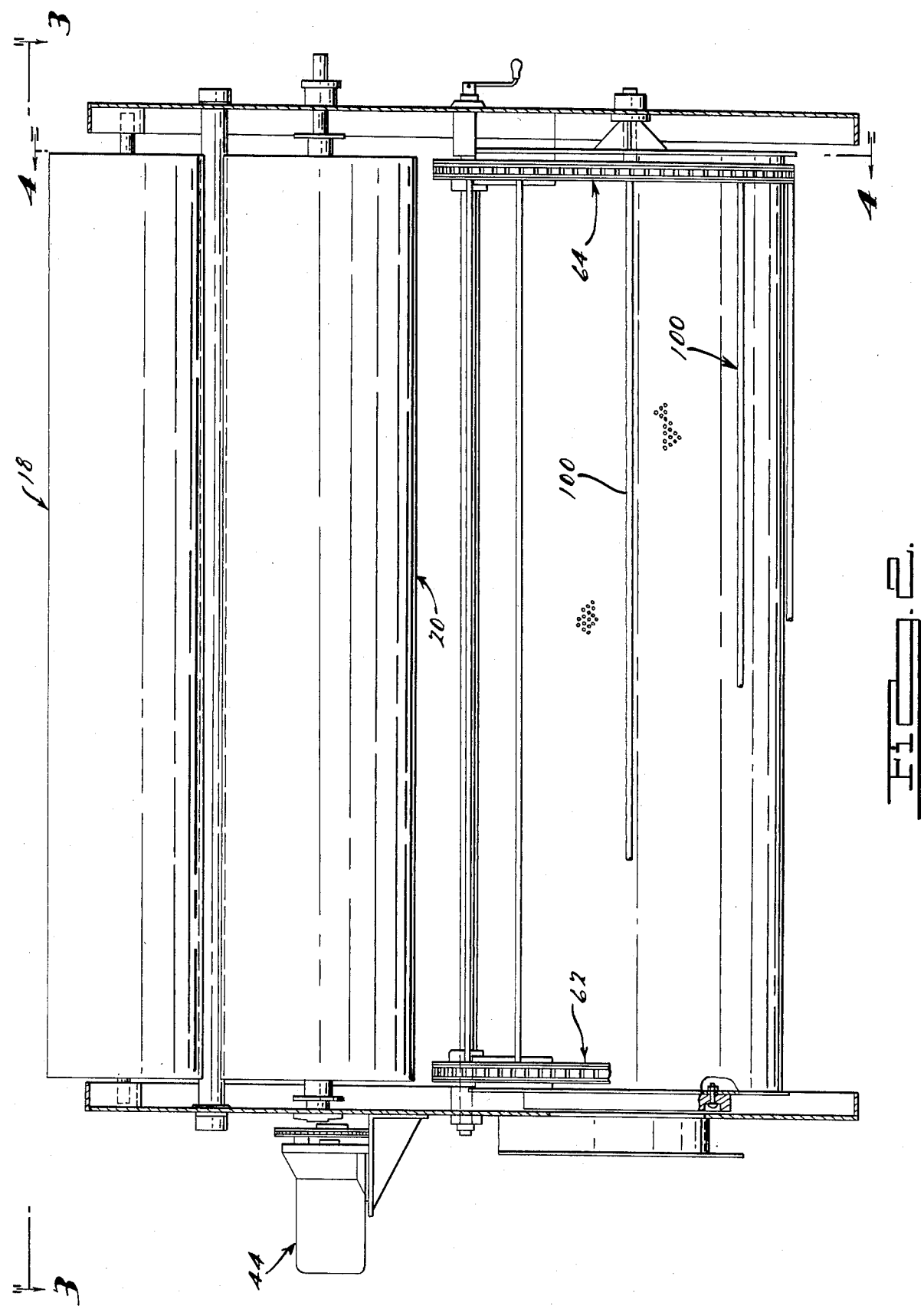

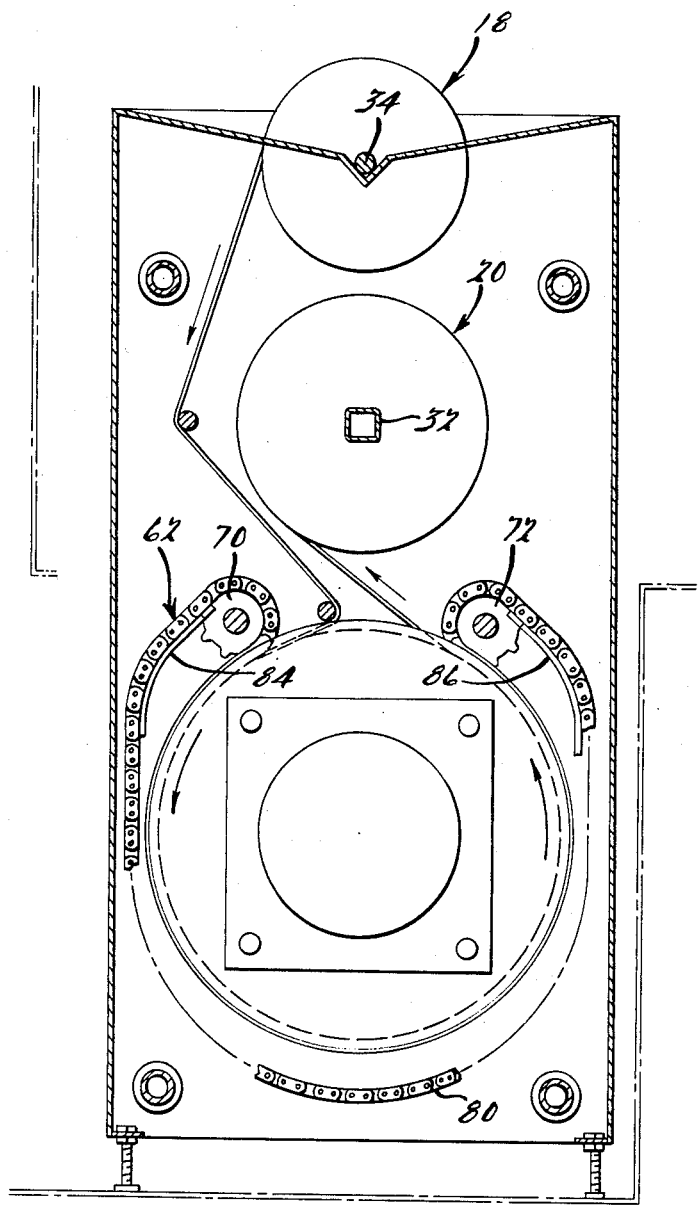

DRUM FILTER HAVING A MEDIA SUPPLY ROLL AND REROLL DRUM

BACKGROUND OF THE INVENTION

A typical application for drum filters is to filter washer liquid at the rinse and wash stage of a phosphate line in an automotive assembly plant. Such drum filters generally comprise a perforate drum which is covered on the outside with a filter media for the filtration of liquid which flows from the outside of the drum to the inside of the drum. Discharge of liquid from the inside of the drum is effected by passing the liquid through the center of a tubular discharge shaft. Clean filter media is stored on a separate roll that is supported on a shaft that is substantially parallel to the shaft of the drum. The clean filter media generally comprises non-woven fibers such as Dacron, nylon, Orlon, etc. While generally satisfactory, such known drum filters have heretofore been faced with the problem of drift of the filter media longitudinally of the drum due to axial walking thereof.

SUMMARY OF THE INVENTION

Since the sludge to which the filter media of the aforesaid type of drum filter is exposed is generally uniformly deposited, reroll of the spent filter media with the contaminant thereon is a practical solution to the problem of media and contaminant handling and disposal. An electric motor drives the shaft of the reroll media roll through a reducer. As the diameter of the reroll roll increases, a variable speed drive adjusts to maintain linear speed of the media constant.

The reroll mechanism is actuated when the level of liquid in a clean liquid tank is lowered to a point at which a float trips a switch that activates a timer in a series with the drive motor. The motor circuit is closed for a preset period of time while the filter media is advanced and clean media is disposed about the drum. The drum itself, since it is substantially completely wrapped with the filter media, is rotated by the filter media as it advances. Since there is always a slight fluid pressure differential between the outside of the drum and the inside of the drum, the filter media is pressed against the surface of the drum assuring that the drum will rotate when the reroll mechanism is actuated. Drift of the filter media toward one side or the other of the drum due to axial walking of the filter media is minimized by utilizing a pair of endless chains that are wrapped around the drum for the support of a plurality of circumferentially spaced longitudinally extending flights. The chains do not serve a drive function, but merely track the drum by virtue of the frictional force between the chains and the media. Once the fresh filter media is started on the drum, it is restrained by the chain and flights against longitudinal or circumferential drift. Therefore, the media is discharged at the same longitudinal position on the drum at which it enters into contact with the drum. The idler chain and flights on the return side of the chain hang down loosely in the form of a catenary so as to apply tension to the chain and hold it against the media on the drum.

BRIEF DESCRIPTION OF THE DRAWINGS

FIG. 2 is a view taken generally along the line 2—2 of FIG. 1.

FIG. 4 is a view taken along the line 4—4 of FIG. 2.

DETAILED DESCRIPTION OF THE PREFERRED EMBODIMENT OF THE INVENTION

Figure 1:
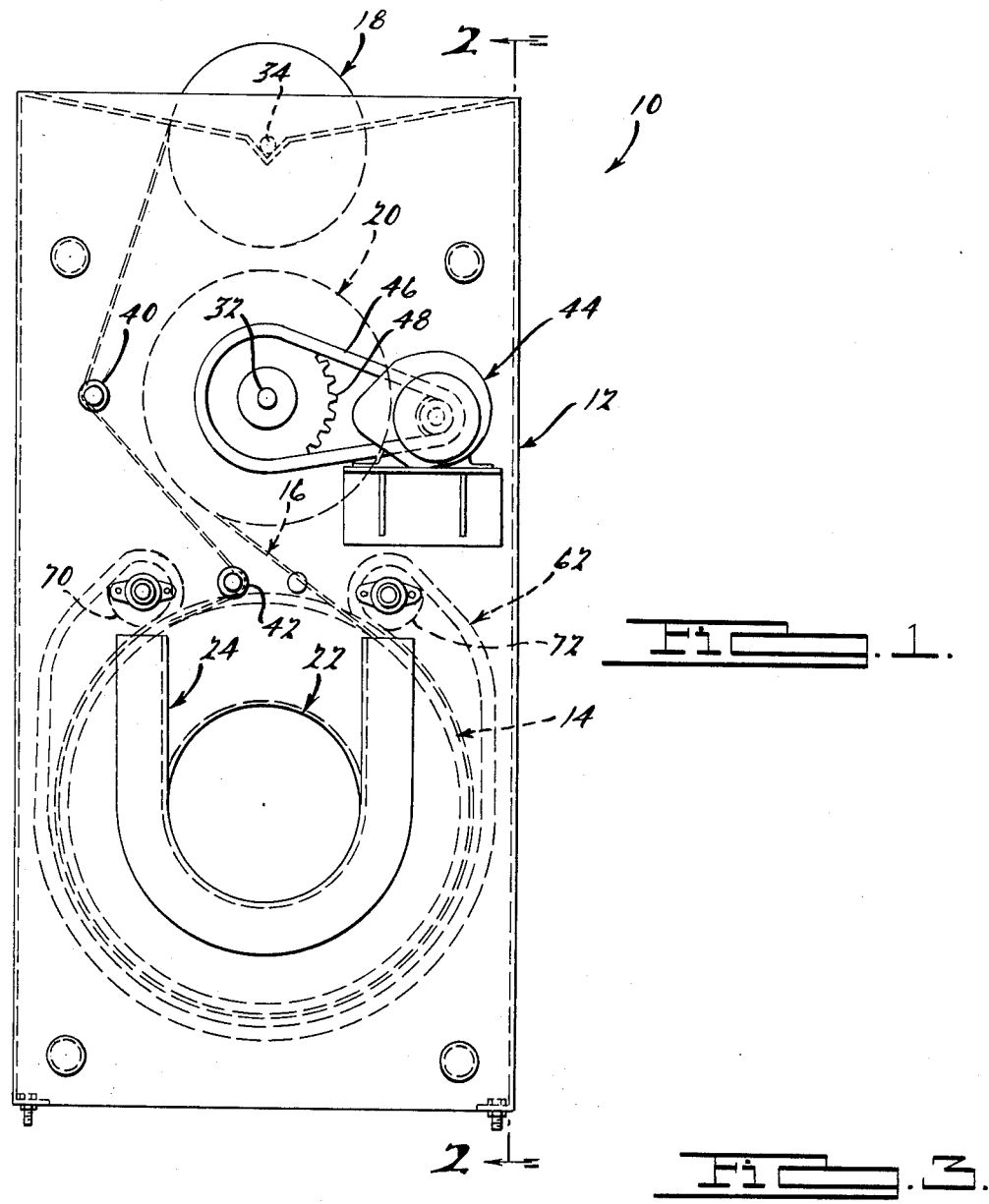
FIG. 1 is a side elevational view of a drum filter in accordance with an exemplary constructed embodiment of the instant invention.
Figure 3:
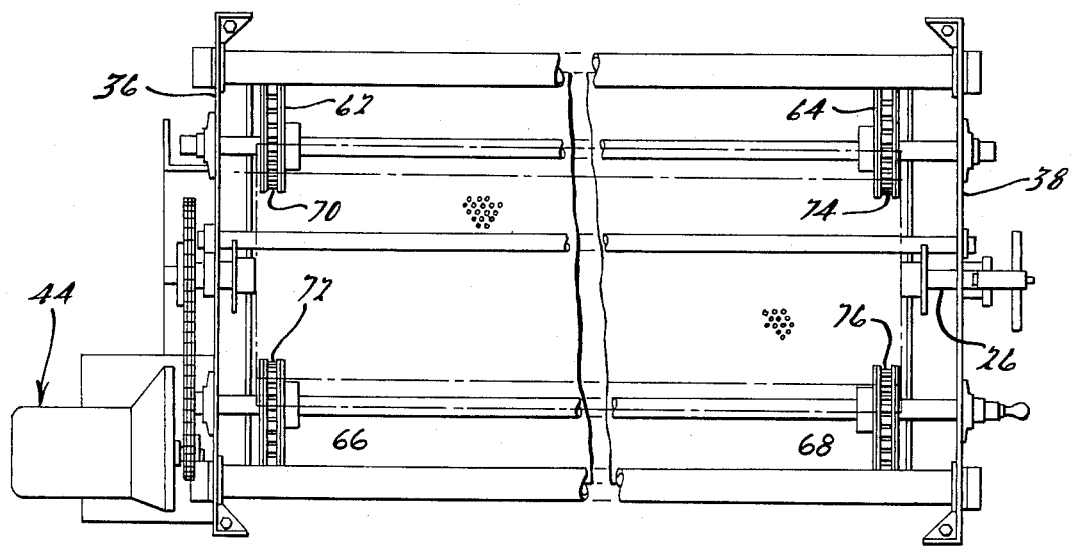
FIG. 3 is a view along the line 3—3 of FIG. 2.

As seen in FIG. 1 of the drawings, a drum filter 10, in accordance with an exemplary constructed embodiment of the invention, comprises a tank 12 having a perforate drum 14 extending transversely thereof for the filtering of liquid through a fibrous sheet type filter media 16.

The media 16 is withdrawn from a fresh media roll 18 and is taken up on a reroll drum or roll 20. The perforate drum 14 is supported at one end on a shaft 22 that is journaled in a saddle bearing 24 and at the other end by a hollow shaft 26. Filtered liquid is withdrawn from the interior of the drum 14 through the hollow drum support shaft 26. The reroll drum 20 is supported on a shaft 32 and the supply roll 18 is supported on a shaft 34. Each of the aforesaid shafts are supported by appropriate bearings mounted on side walls 36 and 38 of the container 12.

The filter media 16 is fed from the supply roll 18 to the perforate drum 14 about rollers 40 and 42, and thence extends about the perforate drum 14 to the reroll drum 20. Tension is applied to the media 16 by the reroll drum 20 which is driven by a conventional variable speed motor 44 through a chain 46 and sprocket 48. The filter media 16 is sufficiently strong to effect rotation of both the perforate drum 14 and supply roll 18 incident to rotation of the reroll drum 20.

In accordance with one feature of the present invention the perforate drum 14 is provided with a media stabilizing system comprising a pair of endless chains 62 and 64 at opposite ends of the drum 14. The chains 62 and 64 extend about complementary pairs of wheels or idler sprockets 70,72, and 74,76, respectively. A clamping portion 80 of each of the chains 62 and 64, one of which is shown, is biased against the media 16 on the drum 14 due to the weight of an outer portion thereof which hangs in catenary configuration freely downwardly relative to the drum 14 over circumferentially spaced guides 84 and 86. The chains 62 and 64 are not driven by the motor 44 but merely track the media 16 on the drum 14 due to frictional engagement therewith.

In accordance with yet another feature of the instant invention, a plurality of longitudinally extending flights 100 extend between the chains 62 and 64 for engagement with the surface of the media 16 at circumferentially spaced positions thereon ensuring that the media 16 is retained against the perforate drum 14 by augmenting the retention force due to the fluid pressure differential thereacross.

In operation, fresh filter media 16 is withdrawn from the media supply roll 18 around rollers 40 and 42 onto the face of the perforate drum 14. The filter media 16 extends under the chains 62 and 64 thence onto the reroll drum 20. Advancement of the media 16 is effected solely by rotation of the reroll drum 20 by a conventional variable speed motor drive 44. Energization of the motor 44 can be controlled by a timer based upon operational history of the filter 10 or by a conventional float type liquid level sensor (not shown) which reflects an increase in input liquid level or a decrease in discharge liquid level due to build-up of contaminants on the filter media 16 which restricts liquid flow therethrough.

The catenary suspension of the chains 62 and 64 results in a relatively simple, effective, and inexpensive means for maintaining a radially inward bias against the media which, in turn, is biased against the drum 14. Since the chains 62 and 64 do not effect rotation of the drum 14, but in contradistinction, are driven by the drum 14, there is no tendency for the chains 62 and 64 to tear or otherwise distort the filter media 16. Moreover, once the chains 62 and 64 are properly positioned, the flights 100 extending therebetween are automatically maintained parallel to the central axis of the drum 14 and against the filter media 16.

While the preferred embodiment of the invention has been disclosed, it should be appreciated that the invention is susceptible of modification without departing from the scope of the following claims.

I claim:

1. An automatic drum filter comprising:
   a perforate right cylindrical drum supported for rotation about a central longitudinal axis,
   means for withdrawing filtered liquid from the interior of said drum,
   a continuous filter media having a portion wrapped around substantially the entire periphery of said drum;
   a supply roll for supplying said media, said supply roll supported for rotation about an axis extending substantially parallel to the axis of said drum;
   a reroll drum for rerolling said media, said reroll drum supported for rotation about an axis substantially parallel to the axis of said drum;
   driving means or rotating said reroll drum; and
   a pair of endless chains having a catenary portion and a portion extending around said drum engagable with the portion of said media wrapped about said drum, said media being biased against the outer surface of said drum by the weight of the catenary portion of said chains.

2. A filter in accordance with claim 1 wherein:
   said chains extend about complementary pairs of idler sprockets disposed on opposite sides of said drum at opposite ends thereof, respectively, said sprockets being rotatable about axes parallel to the axis of rotation of said drum.

3. A drum filter according to claim 2 wherein said idler sprocket pairs are horizontally aligned, whereby each of said endless chains extends around the drum, around one said idler sprocket of said pair with returning portions of said chains hanging loosely in a generally catenary configuration, tracks around the other said idler sprocket of said pair, and returns to the drum.

4. A filter in accordance with claim 2, further including a plurality of spaced flight bars extending parallel to the axis of rotation of said drum between and supported by said chains.

5. A drum filter according to claim 1 wherein said chains include means for tracking said media on said drum due to frictional engagement therewith.

* * * * *